(12) United States Patent
Fitzgerald et al.

(10) Patent No.: US 8,146,098 B2
(45) Date of Patent: Mar. 27, 2012

(54) METHOD AND APPARATUS FOR INTERFACING WITH A COMPUTER USER VIA VIRTUAL THUMBNAILS

(75) Inventors: Joseph J. Fitzgerald, Franklin Lakes, NJ (US); Oleg Barenboim, Fort Lee, NJ (US); Daniel A. Clarizio, Antelope, CA (US); Eric Winchell, Kingston, NY (US); Thomas C. Hennessy, Morris Plains, NJ (US)

(73) Assignee: ManageIQ, Inc., Mahwah, NJ (US)

( * ) Notice: Subject to any disclaimer, the term of this patent is extended or adjusted under 35 U.S.C. 154(b) by 1084 days.

(21) Appl. No.: 11/852,120

(22) Filed: Sep. 7, 2007

(65) Prior Publication Data

US 2009/0070781 A1    Mar. 12, 2009

(51) Int. Cl.
*G06F 9/44* (2006.01)
*G06F 3/048* (2006.01)

(52) U.S. Cl. .................... 719/316; 715/778
(58) Field of Classification Search .............. 719/316
See application file for complete search history.

(56) References Cited

U.S. PATENT DOCUMENTS

| | | |
|---|---|---|
| 5,581,764 A | 12/1996 | Fitzgerald |
| 5,761,477 A | 6/1998 | Wahbe |
| 6,000,000 A | 12/1999 | Hawkins |
| 6,085,244 A | 7/2000 | Wookey |
| 6,169,976 B1 | 1/2001 | Colosso |
| 6,253,258 B1 | 6/2001 | Cohen |
| 6,292,889 B1 | 9/2001 | Fitzgerald |
| 6,381,677 B1 | 4/2002 | Beardsley |
| 6,711,660 B1 | 3/2004 | Milne |
| 6,772,330 B2 | 8/2004 | Merkin |
| 6,850,252 B1 | 2/2005 | Hoffberg |
| 7,024,549 B1 | 4/2006 | Luu |
| 7,100,195 B1 | 8/2006 | Underwood |

(Continued)

FOREIGN PATENT DOCUMENTS

CA    2547630    6/2005

(Continued)

OTHER PUBLICATIONS

Written Opinion of the International Searching Authority for International Application No. PCT/US08/84849 dated Jan. 12, 2009.

(Continued)

*Primary Examiner* — Andy Ho
*Assistant Examiner* — Abdou Seye
(74) *Attorney, Agent, or Firm* — K&L Gates LLP

(57) ABSTRACT

Methods and apparatus of interfacing with a computer user via virtual thumbnails are disclosed. The system determines the number of zones for each virtual thumbnail, the variable to represent in each zone, and the current state of each of those variables. The system then dynamically renders each of the virtual thumbnails accordingly. For example, if the top-left zone of a virtual thumbnail is to indicate the current operating system associated with a virtual machine, and the current operating system for that virtual machine is Microsoft Windows, then the system displays a flying window icon in the top-left zone of that virtual thumbnail. Once the virtual thumbnail are displayed, the system looks for events associated with the virtual thumbnails (e.g., a click in one of the zones) and executes instructions in response to detecting those events (e.g., show virtual thumbnails indicative of the operating system's services if the operating system zone of a virtual thumbnail is clicked).

32 Claims, 9 Drawing Sheets

U.S. PATENT DOCUMENTS

| | | | |
|---|---|---|---|
| 7,496,757 | B2 | 2/2009 | Abbott |
| 7,506,265 | B1* | 3/2009 | Traut et al. ............... 715/763 |
| 7,577,722 | B1 | 8/2009 | Khandekar |
| 7,577,828 | B2 | 8/2009 | Sammer |
| 7,594,185 | B2* | 9/2009 | Anderson et al. ............. 715/778 |
| 7,698,545 | B1 | 4/2010 | Campbell |
| 7,802,084 | B2 | 9/2010 | Fitzgerald |
| 2002/0073236 | A1 | 6/2002 | Helgeson |
| 2003/0009752 | A1 | 1/2003 | Gupta |
| 2003/0037181 | A1 | 2/2003 | Freed |
| 2003/0070087 | A1 | 4/2003 | Gryaznov |
| 2004/0073899 | A1 | 4/2004 | Luk |
| 2004/0128670 | A1 | 7/2004 | Robinson |
| 2004/0172550 | A1 | 9/2004 | Sai |
| 2004/0204266 | A1 | 10/2004 | Owens |
| 2004/0205101 | A1 | 10/2004 | Radhakrishnan |
| 2004/0210653 | A1 | 10/2004 | Kanoor |
| 2004/0268347 | A1 | 12/2004 | Knauerhase |
| 2005/0033970 | A1 | 2/2005 | Anson |
| 2005/0125513 | A1 | 6/2005 | Sin-LingLam |
| 2005/0246436 | A1 | 11/2005 | Day |
| 2005/0262101 | A1 | 11/2005 | Halpern |
| 2005/0283640 | A1 | 12/2005 | Cheston |
| 2005/0289542 | A1 | 12/2005 | Uhlig |
| 2006/0004667 | A1 | 1/2006 | Neil |
| 2006/0010440 | A1 | 1/2006 | Anderson |
| 2006/0025985 | A1 | 2/2006 | Vinberg |
| 2006/0026219 | A1 | 2/2006 | Orenstein |
| 2006/0036570 | A1 | 2/2006 | Schaefer |
| 2006/0059253 | A1 | 3/2006 | Goodman |
| 2006/0075252 | A1 | 4/2006 | Kallahalla |
| 2006/0136720 | A1 | 6/2006 | Armstrong |
| 2006/0136910 | A1 | 6/2006 | Brickell |
| 2006/0136911 | A1 | 6/2006 | Robinson |
| 2006/0155735 | A1 | 7/2006 | Traut |
| 2006/0179476 | A1 | 8/2006 | Challener |
| 2006/0184937 | A1 | 8/2006 | Abels |
| 2006/0218536 | A1 | 9/2006 | Kirilline |
| 2006/0218544 | A1 | 9/2006 | Chakraborty |
| 2006/0225065 | A1 | 10/2006 | Chandhok |
| 2006/0274060 | A1* | 12/2006 | Ni et al. ............... 345/419 |
| 2006/0294421 | A1 | 12/2006 | Schneider |
| 2007/0043860 | A1 | 2/2007 | Pabari |
| 2007/0050409 | A1 | 3/2007 | Bugir |
| 2007/0130232 | A1 | 6/2007 | Therrien |
| 2007/0179987 | A1 | 8/2007 | Lim |
| 2007/0180493 | A1 | 8/2007 | Croft |
| 2007/0192329 | A1 | 8/2007 | Croft |
| 2007/0198612 | A1 | 8/2007 | Prahlad |
| 2007/0198656 | A1 | 8/2007 | Mazzaferri |
| 2007/0204266 | A1 | 8/2007 | Beaty |
| 2007/0208685 | A1 | 9/2007 | Blumenau |
| 2007/0214408 | A1 | 9/2007 | Straub |
| 2008/0016187 | A1 | 1/2008 | Neil |
| 2008/0126439 | A1 | 5/2008 | Kaminsky |

FOREIGN PATENT DOCUMENTS

| | | |
|---|---|---|
| WO | 2006036277 | 4/2006 |

OTHER PUBLICATIONS

Written Opinion of the International Search Authority for International Application No. PCT/US07/81636 dated Jun. 3, 2008.
Written Opinion of the International Search Authority for International Application No. PCT/US07/81652 dated Apr. 23, 2008.
Written Opinion of the International Search Authority for International Application No. PCT/US07/81646 dated May 5, 2008.
Written Opinion of the International Search Authority for International Application No. PCT/US07/81647 dated Jun. 3, 2008.
"Cache-Based System Management Architecture with Virtual Applicances, Network Repository and Virtual Appliance Transceivers," Jun. 9, 2005, 23 pages.
"Configuration Management," Hewlett-Packard Development Company, L.P., 2006 [online] [Retrieved on Dec. 15, 2006] Retrieved from the Internet.
"Configuration Management Solutions for Desktops," Hewlett-Packard Development Company, L.P., 2006, [online] [Retrieved on Dec. 15, 2006] Retrieved from the Internet <URL:http://openview.hp.com/products/radia_mdsk/index.html>.
"Configuration Management Solutions for Servers," Hewlett-Packard Development Company, L.P., 2006, [online] [Retrieved on Dec. 15, 2006] Retrieved from the Internet.
"EFI Framework FAQs," American Megatrends, Inc., 2004, 4 pages.
"JP1 Version 7i Desktop Management," Hitachi Asia Ltd., 2005 4 pages.
"Managing Configurations and Compliance with Oracle Enterprise Manager 10g," An OracleWhite Paper, Oracle, Sep. 2005, 9 pages.
"Microsoft Windows XP: Using Software Restriction Policies to Protect Against Unauthorized Software," Microsoft TechNet, Jan. 1, 2002, 28 pages.
"MSN Reduces New Server Build and Deploy Time by 98 Percent," Microsoft Corporation, Sep. 2003, 6 pages.
"Unicenter CA—Teleview Session Management, Enterprise Systems Management," ca , 2006, [online] [Retrieved on Dec. 15, 2006] Retrieved from the Internet <URL:http://www3.ca.com/solutions/Product.aspx?ID=1525>.
VMTN—Virtual Appliances: How to Build a Virtual Appliance,: VMware, Inc., 2006, 9 pages.
"VMware ACE, Product Datasheet," VMware, Inc., 2005, 2 pages.
Apvrille, A. et al., "DigSig: Run-Time Authentication of Binaries at Kernel Level," 2004 LISA XVIII, Nov. 14-19, 2004, pp. 59-66.
Bakos, G., "Honeypots and the Enterprise: Intelligence-based Risk Management," Institute for Security Technology Studies, Dartmouth College, 98 pages, 2004.
Banerjee, S.et al., "Scalable Grid Service Discovery Based on UDDI," MGC '05, Nov. 28-Dec. 2, 2005, ACM, 6 pages.
Bloehdorn, S. et al., "TagFS—Tag Semantics for Hierarchical File Systems,"In Proceedings of the 6th International Conference on Knowledge Management (I-KNOW 06), Graz, Austria, Sep. 2-6, 2006, 8 pages, [online] Retrieved from the Internet.
Calder, B. et al., "The Entropia Virtual Machine for Destop Grids," VEE'05, ACM, Jun. 11-12, 2005, pp. 1-11.
Casper, B., "Using Network Appliance Snapshot Technology with VMware® ESX Server," Network Appliance, Inc., 2005, 14 pages.
Chen, Y., "Service-Oriented Computing: Architecture, Programming, and Applications," The Ninth IASTED International Conference on Software Engineering and Applications, Nov. 14-16, 2005, 40 pages.
Doser, J., "Generating Access Control Infrastructures from SecureUML Models," Albert-Ludwigs-Unversitat Freiburg, 24 pages, 2003.
Doser, J., "Using SecureUML to Secure Controllers," Albert-Ludwigs-Unversitat Freiburg. 28 pages, 2003.
Garfinkel, T. et al., "Terra: A Virtual Machine-Based Platform for Trusted Computing," SOSP '03, ACM, Oct. 19-22, 2003, pp. 193-206.
Garfinkel, T. et al., "When Virtual is Harder Than Real: Security Challenges in Virtual Machine Based Computing Environments," 6 pages, 2005.
Goldfein, J., "PAC095 Workstation 5 and Beyond: What's New," VMworld2005, Virtualize Now, 2005, 30 pages.
Haldar, V. et al., "Semantic Remote Attestation—A Virtual Machine Directed Approach to Trusted Computing," Proceedings of the Third Virtual Machine Research and Technology Symposium, USENIX Association, San Jose, CA, May 6-7, 2004, 14 pages.
International Search Report and Written Opinion of the International Searching Authority for International Application No. PCT/US08/84823 dated Jan. 22, 2009.
International Search Report and Written Opinion of the International Searching Authority for International Application No. PCT/US08/84829, dated Jan. 22, 2009.
International Search Report and Written Opinion of the International Searching Authority for International Application No. PCT/US08/84834, dated Jan. 13, 2009.
International Search Report and Written Opinion of the International Searching Authority for International Application No. PCT/US08/84844 dated Jan. 16, 2009.
International Search Report and Written Opinion of the International Searching Authority for International Application No. PCT/US08/84860 dated Jan. 23, 2009.

Keahey, K., "Working Spaces: Virtual Machines in the Grid," Globus World 2005, Feb. 10, 2005, 23 pages.
Keahey, K. et al., "Virtual Infrastructure in the Grid," Jan. 30, 2006, 19 pages.
Keahey, K. et al., "Virtual Workspaces Achieving Quality of Service and Quality of Life in the Grid,"12 pages, 2005.
Kieffer, M., "Windows Virtualization Architecture," Microsoft Corporation, 2005, 23 pages.
Kim.H. et al., "Autograph: Toward Automated, Distributed Worm Signature Detection," 16 pages, 2004.
King, S.T. et al., "SubVirt: Implementing Malware with Virtual Machines," 14 pages, 2006.
Krsul, I. et al., "VMPLants: Providing and Managing Virtual Machine Executiopn Environments for Grid Computing," IEEE, 2004, pp. 1-12.
Laverick, M., "VMware ESX 2.1/5 Server Administration II, Documents Version 1.3" RTFM Education, 117 pages, 2006.
Lemos, R., "Your Own Personal Matrix," PC Magazine, Oct. 17, 2006, 1 page.
Lin, B. et al., Towards an Understanding of Decision Complexity in IT Configuration,: IBM Corporation, 2006, 16 pages.
Lu, W. et al., "Making Your Workspace Secure: Establishing Trust with VMs in the Grid," 10 pages, 2007.
MacFarland, A. "PlateSpin Builds Flexibility into a clone-Based Data Center Lifestyle," The Clipper Group Navigator, Feb. 8, 2006, pp. 1-4.
Martinez, P. et al., "Using the Script MIB for Policy-Based Configuration Management," 16 pages, 2002.
Mohan, P. et al., "Semantic File Retrieval in File Systems Using Virtual Directories," 4 pages, 2006, [online] Retrieved from the Internet <URL:http://www.hipc.org/hipc2006/posters/semfs.pdf>.
Naik, V.K. et al., "Configuring, Deploying, and Managing Virtual Grid Environments," pp. 1-5, 2005.
Newsome, J. et al., "Polygraph: Automatically Generating Signatures for Polymorphic Worms," 16 pages, 2005.
Newsome, J. et al., "Polygraph: Automatically Generating Signatures for Polymorphic Worms," May 2005, 46 pages.
Potnis, N., "Debugging OS's with Time Traveling Virtual Machines," University of Michigan, 26 pages, 2006.
Reinhardt, M., "Energy-Aware Scheduling of Virtual Machines in a Multiprocessor Environment," Universitat Karlsruhe, Jun. 13, 2006, 86 pages.
Schenk, S. et al., "TagFS: Bringing Semantic Metadata to the Filesystem," Institute for Computer Science, University of Koblenz, 2 pages, [online] Retrieved from the Internet.
Schenk, S. et al. "TagFS—TagSemantics for Hierarchical File Systems," 2006, University of Koblenz Landau Germany, 31 pages, [online] Retrieved from the Internet.
Sirer, E.G. et al., "Design and Implementation of a Distributed Virtual Machine for Networked Computers," SOSP-17, ACM, Dec. 1999, pp. 202-216.
St. Arnaud, B., "Service Oriented Architectures for R&E Networks" Google Mashing Everything, CANARIE, Inc., 18 pages, 2006.
Stewart, V., "Network Appliance & VMware ESX Server: Instantaneous Backup & Recovery with NetApp Snapshot Technology," Oct. 2005, 15 pages.
Sufatrio et al., "A Machine-Oriented Integrated Vulnerability Database for Automated Vulnerability Detection and Processing," 2004 LISA XVII, Nov. 14-19, 2004, pp. 47-58.
Traugott, S. et al. "Why Order Matters: Turing Equivalence in Automated Systems Adminstration," USENIX Large Installation System Administration Conference, Nov. 3-8, 2002, pp. 1-35.
TRIUMF/HEPnet Lightpath Object Composition GUI, Canarie, 14 pages, 2005.
Verdon, D. et al. "Risk Analysis in Software Design," IEEE Security & Privacy, 2004, pp. 32-37.
VMworld2005 Virtualize Now, VMware Education Services Course, Las Vegas, Oct. 18-20, 2005, 10 pages.
Waldspurger, C., PAC485 Managing Datacenter Resources Using the VirtualCenter Distributed Resource Scheduler, VMWorld2005, VMware, Inc., 2005, 36 pages.
Wang, Y-M, et al., "Detecting Stealth Software with Strider GhostBuster," Dec. 13, 2004, Technical Report MSR-TR-2005-25, Microsoft Corporation, 11 pages.
Wang, Y-M, et al. Gatekeeper: Monitoring Auto-Start Extensibility Points (ASEPs) for Spyware Management, 2004 LISA XVIII, Nov. 14-19, 2004, pp. 33-46.
Whitaker, A. et al., "Using Time Travel to Diagnose Computer Problems," 6 pages, 2004.
Williams, M.A., "Anti-Trojan and Trojan Detection with In-Kernel Digital Signature Testing of Executables," NetXSecure NZ Limited, pp. 1-12, Apr. 16, 2002.
Zhao, X. et al., "SVGrid: A SecureVirtual Environment for Untrusted Grid Applications," pp. 1-8, 2005.
International Search Report and Written Opinion of the International Searching Authority for International Application No. PCT/US08/84853, dated Jan. 28, 2009.
Written Opinion of the International Search Authority for International Application No. PCT/US07/81644 dated Jun. 17, 2008.
Written Opinion of the International Searching Authority for International Application No. PCT/US08/84844 dated Jan. 16, 2009.

* cited by examiner

METHOD AND APPARATUS FOR INTERFACING WITH A COMPUTER USER VIA VIRTUAL THUMBNAILS

TECHNICAL FIELD

The present application relates in general to user interfaces and more specifically to methods and apparatus of interfacing with a computer user via virtual thumbnails.

BACKGROUND

Computers are capable of retrieving and displaying such large quantities of information (often in the form of text based tables), that people often find it difficult to quickly digest the portion of the available information that they are interested in. Icons help to reduce the reliance on text, but icons typically fail to convey multiple pieces of information. In addition, most icons are only used to perform one thing (e.g., launch an application), and the information conveyed by most icons is not user definable.

DETAILED DESCRIPTION OF EXAMPLE EMBODIMENTS

Figure 1:
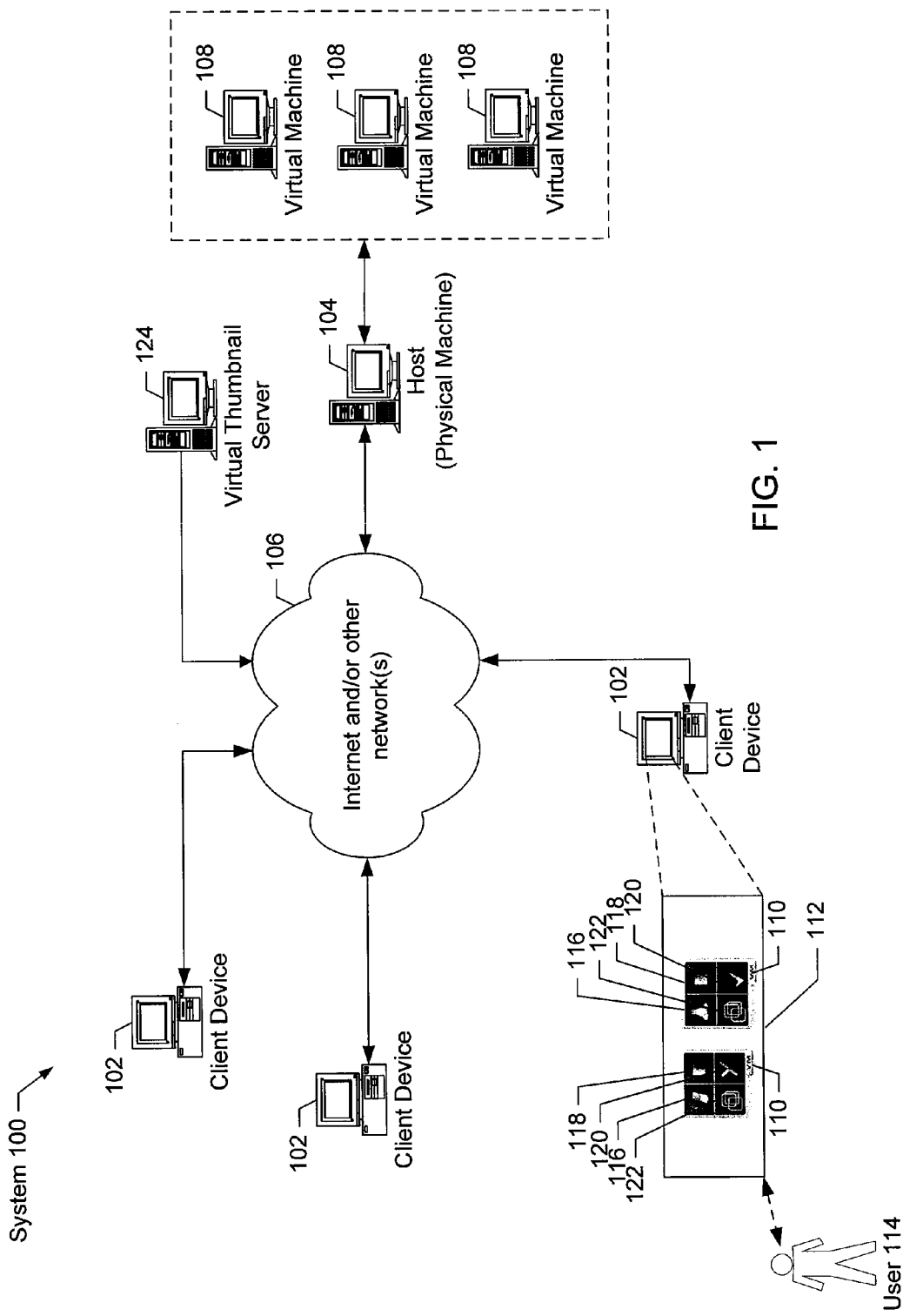
FIG. 1 is a high level block diagram of a communications system.

The present system is most readily realized in a network communications system. A high level block diagram of an exemplary network communications system 100 is illustrated in FIG. 1. The illustrated system 100 includes one or more client devices 102, one or more hosts 104, and one or more virtual thumbnail servers 124. The clients 102, hosts 104, and virtual thumbnail servers 124 may communicate with each other via a connection to one or more communications channels 106 such as the Internet or some other data network, including, but not limited to, any suitable wide area network or local area network. It will be appreciated that any of the devices described herein may be directly connected to each other instead of over a network.

One host 104 and/or virtual thumbnail server 124 may interact with a large number of client devices 102 devices. Accordingly, each host 104 and/or virtual thumbnail server 124 is typically a high end computer with a large storage capacity, one or more fast microprocessors, and one or more high speed network connections. Conversely, relative to a typical host 104 and/or virtual thumbnail server 124, each client device 102 typically includes less storage capacity, a single microprocessor, and a single network connection.

Each host 104 and/or virtual thumbnail server 124 is a physical machine that stores a plurality of files, programs, and/or web pages in one or more memories for use by the client devices 102. For example, a physical machine 104 may host a plurality of virtual machines 108. A virtual machine 108 appears to be a complete physical machine to end users. However, multiple virtual machines 108 typically execute on a single physical machine 104. Each virtual machine 108 may be configured differently with its own operating system, applications, memory, virtual hardware, etc.

As described in more detail below, a client device 102 may display one or more virtual thumbnails 110 on a display 112. Preferably, data indicative of these virtual thumbnails 110 comes from the virtual thumbnail server 124. In this example, two virtual thumbnails 110 are displayed to represent two virtual machines 108 that are being managed by a user 114. Although systems management examples are used herein, any suitable type of variable may be represented by a virtual thumbnail 110, such as personnel directory variables, retail variables, etc. Each virtual thumbnail 110 in FIG. 1 includes four zones. Of course, any number of zones may be included in a virtual thumbnail 110. In this example, the top-left zone 116 indicates the operating system associated with the corresponding virtual machine 108 (e.g., a flying window icon for Microsoft Windows, a seated penguin for Linux, etc.). The top-right zone 118 indicates the current run state of the corresponding virtual machine 108 (e.g., a solid block for stopped, two vertical lines for paused, or a right facing triangle for running). The bottom-right zone 120 indicates whether the corresponding virtual machine 108 passed one or more policy tests (e.g., a check mark for passed or an X for not passed). The bottom-left zone 122 indicates the container type of the corresponding virtual machine 108 (e.g., an icon for VMware, Xen, Microsoft, etc.).

Figure 2:
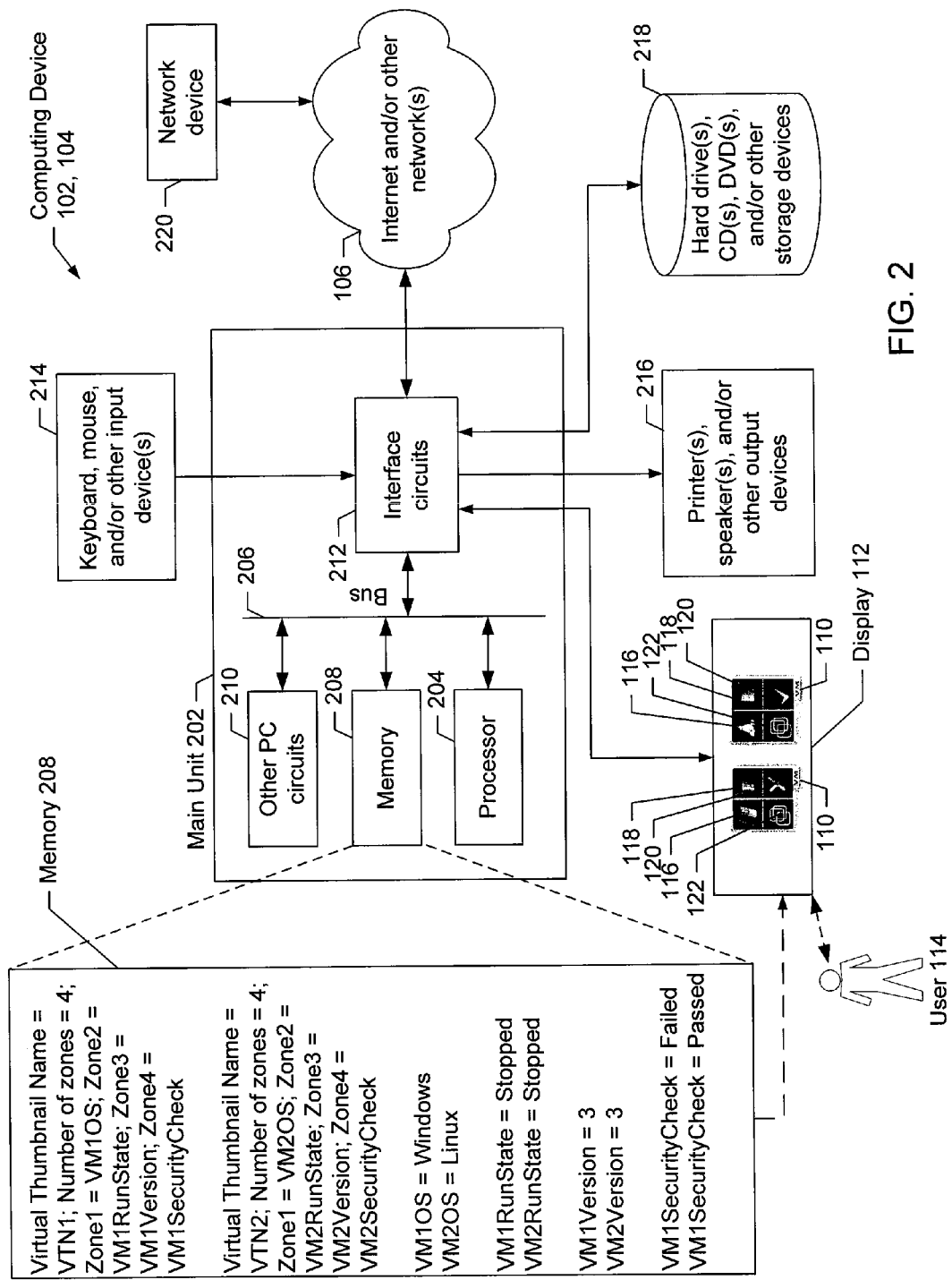
FIG. 2 is a more detailed block diagram showing one example of a computing device.

A more detailed block diagram of the electrical systems of a computing device (e.g., a client device 102, host 104, and/or virtual thumbnail server 124) is illustrated in FIG. 2. In this example, the computing device 102, 104, 124 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from a computing device 102, 104, 124 and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays 112, printers, speakers, and/or other output devices 216 may also be connected to the main unit 202 via the interface circuit 212. The display 112 may be a cathode ray tube (CRTs), liquid crystal displays (LCDs), or any other type of display. The display 112 generates visual displays of data generated during operation of the computing device 102, 104, 124. For example, the display 112 may be used to display web pages received from a computing device 102, 104, 124. The visual displays may include prompts for human input, run time statistics, calculated values, data, etc. In one example described in more detail below, the display 112 may show a plurality of virtual thumbnails 110 indicative of a plurality of virtual machines 108.

One or more storage devices 218 may also be connected to the main unit 202 via the interface circuit 212. For example, a hard drive, CD drive, DVD drive, and/or other storage devices may be connected to the main unit 202. The storage devices 218 may store any type of data used by the computing device 102, 104, 124.

The computing device 102, 104, 124 may also exchange data with other network devices 220 via a connection to the network 106. The network connection may be any type of network connection, such as an Ethernet connection, digital subscriber line (DSL), telephone line, coaxial cable, etc. Access to a computing device 102, 104, 124 can be controlled by appropriate security software or security measures. An individual users' access can be defined by the computing device 102, 104, 124 and limited to certain data and/or actions. Accordingly, users of the system 100 may be required to register with one or more computing devices 102, 104, 124.

Client devices 102 may connect to the host 104 and/or virtual thumbnail server 124 (directly or indirectly) to retrieve data and initiate actions For example, a user 114 at a client device 102 may see that a virtual machine 108 is stopped by viewing the upper-right zone 118 of a virtual thumbnail 110 representing that virtual machine 108, and then the user 114 may click on the upper-right zone 118 of the virtual thumbnail 110 to start the corresponding virtual machine 108.

Figure 3:
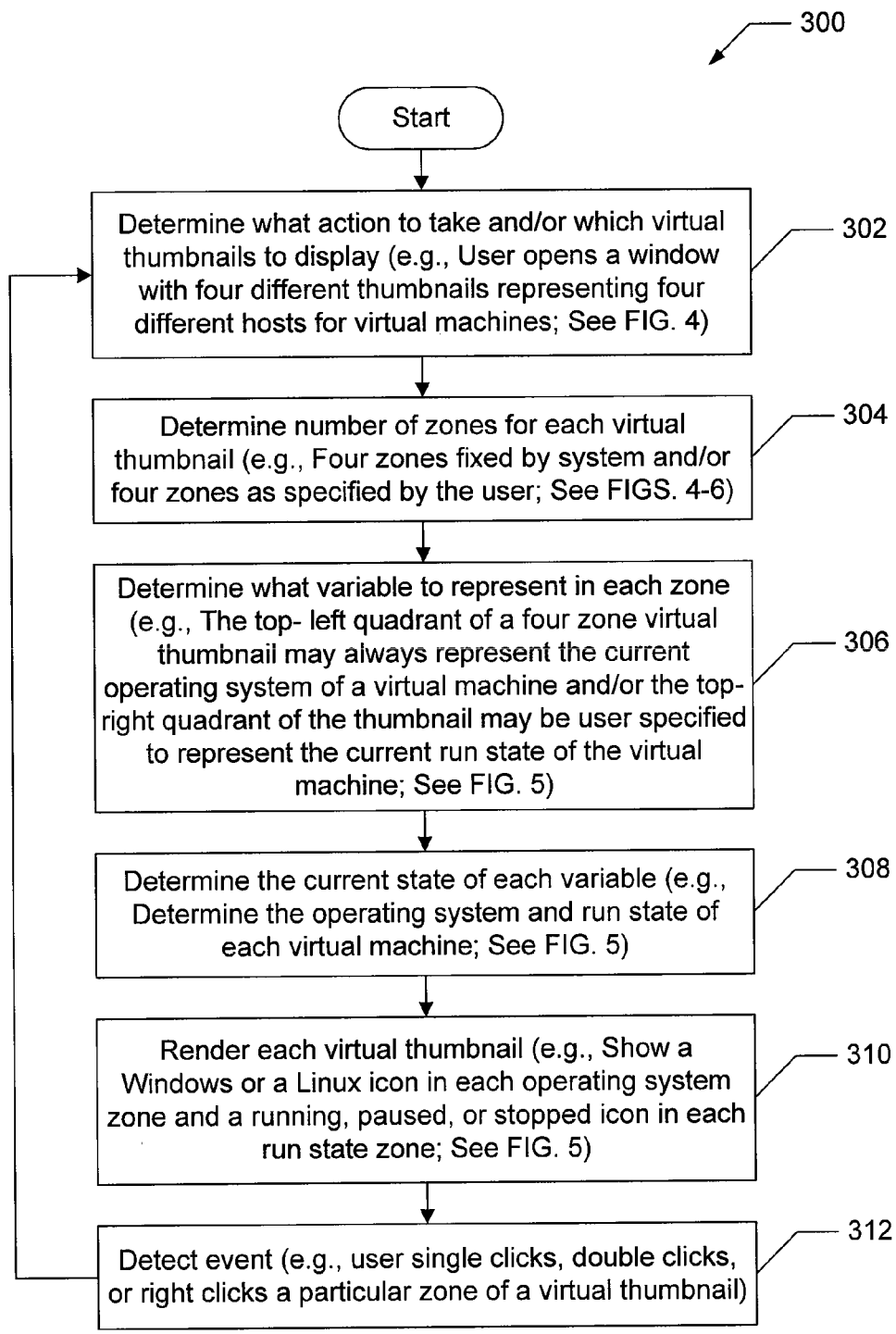
FIG. 3 is a flowchart of an example process to interface a user with a computer.

A flowchart of an example process 300 for interfacing with a computer user via virtual thumbnails is illustrated in FIG. 3. Preferably, the process 300 is embodied in one or more software programs which is stored in one or more memories and executed by one or more processors. Although the process 300 is described with reference to the flowchart illustrated in FIG. 3, it will be appreciated that many other methods of performing the acts associated with process 300 may be used. For example, the order of many of the steps may be changed, and many of the steps described are optional.

Generally, the system 100 determines the number of zones for each virtual thumbnail 110, the variable to represent in each zone, and the current state of each of those variables. The system 100 then renders each of the virtual thumbnails 110 accordingly. For example, if the top-left zone 116 of a virtual thumbnail 110 is to indicate the current operating system associated with a virtual machine 108, and the current operating system for that virtual machine 108 is Microsoft Windows, then the system 100 displays a flying window icon in the top-left zone 116 of that virtual thumbnail 110. Once the virtual thumbnails 110 are displayed, the system looks for events associated with the virtual thumbnails 110 (e.g., a click in one of the zones) and executes instructions in response to detecting those events (e.g., show virtual thumbnails 110 indicative of the operating system's services if the operating system zone of a virtual thumbnails 110 is clicked).

Figure 4:
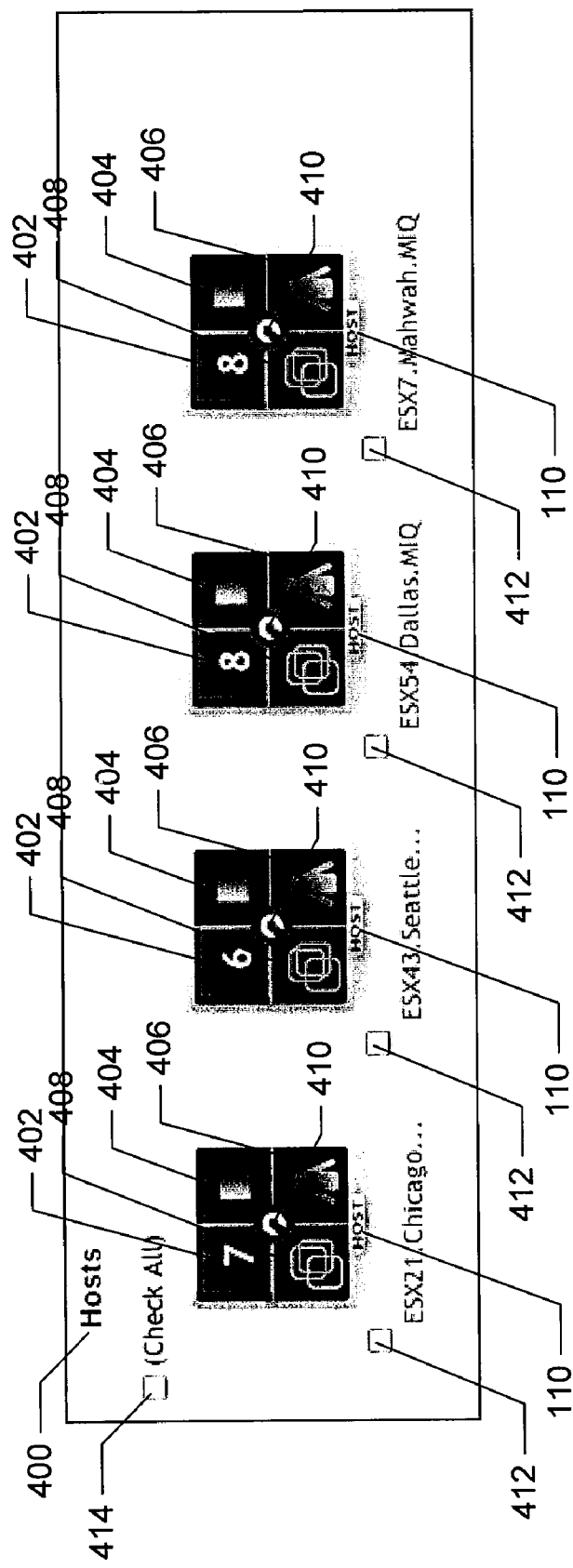
FIG. 4 is an example screenshot showing a plurality of virtual thumbnails representing a plurality of hosts.

The process 300 begins when a computing device 102, 104, 124 determines what action to take and/or which virtual thumbnails 110 to display (block 302). For example, a user 114 may open a user interface window with a plurality of virtual thumbnails 110. An example of a user interface window 400 with a plurality of virtual thumbnails 110 is illustrated in FIG. 4. In this example, the window 400 include four virtual thumbnails 110. Each virtual thumbnail 110 may represent a different physical machine 104. Each of these physical machines 104 may be a host for a plurality of different virtual machines 108. In this example, each virtual thumbnails 110 includes five zones. The top-left zone 402 represents the number of virtual machines 108 registered and/or running on the associated host 104 (e.g., 6, 7, 8, etc.). The top-right zone 404 represents the power-state of the associated host 104 (e.g., a solid block for on or an open circle for off). The bottom-right zone 406 represents the owner and/or department of the associated host 104 (e.g., John Doe, Company XYZ, etc.). The bottom-left zone 408 represents the virtualization type of the associated host 104 (e.g., an icon for VMware, ESX, VMware server, Xen, Microsoft Virtual Server, etc.). The center zone 410 represents the virtual machine management software used on the associated host 104 (e.g., an icon for ManageIQ, Company XYZ, etc.).

In addition, each virtual thumbnail 110 may include an associated checkbox 412. Preferably, the checkboxes 412 are used to select multiple thumbnails 110 for a batch processing action. Any suitable action may be used. Example actions include start, stop, pause, resynchronize, snapshot, rescan, suspend, power down, etc. For example, if the user 114 wants to start several hosts 104 and/or virtual machines 108, the user 114 may check each associated check box 412 and then select a start action. The start action may be any suitable start action. For example, the user 114 may select a start button or a start choice from a dropdown menu. Alternatively, the user 114 may initiate the action on one of the selected virtual thumbnails 110. For example, to start a stopped host 104 associated with a virtual thumbnail 110 (and all of the other selected virtual thumbnails 110), the user 114 may click or double click on the run-state zone of the virtual thumbnail 110 (e.g., toggling the icon in that zone from a solid block for stopped to a right facing triangle for running). As a shortcut, the user may click a select check all checkbox 414 to put all of the checkboxes in an associated window in the check state. For example, if the user 114 wants to start all hosts 104 and/or virtual machines 108 shown in a window, the user 114 may check the check all checkbox 414 and then select a start action.

Returning to FIG. 3, the next step in the example process 300 is to determine the number of zones for each virtual thumbnail 110 (block 304). For example, a particular virtual thumbnail 110 may have four zones (e.g., quadrants of a square). The number of zones for each virtual thumbnail 110 may be fixed by the system 100. For example, all virtual thumbnails 110 may have four zones, and/or some virtual thumbnails 110 may have nine zones. The number of zones for each virtual thumbnail 110 may also be dynamically determined by the system 100. For example, if the user 114 enables certain features and/or certain system variables have certain values, then the system 100 may decide to increase or decrease the number of zones for a particular virtual thumbnail 110. In addition, the number of zones for each virtual thumbnail 110 may be specified by the user 114. For example, the user 114 may be allowed to design one or more virtual thumbnails 110 by selecting a subset of variables from a plurality of variables for display on a virtual thumbnail 110. Any suitable selection mechanism may be used. For example, the user 114 may be allowed to drag and drop variable identifiers from a list of variable identifiers to a virtual thumbnail 110 or a virtual thumbnail template to include the associated variables in the virtual thumbnail 110. The system 100 may respond by automatically adjusting the number of zones associated with the virtual thumbnail 110 to accommodate the number of variable selected by the user 114.

Figure 5:
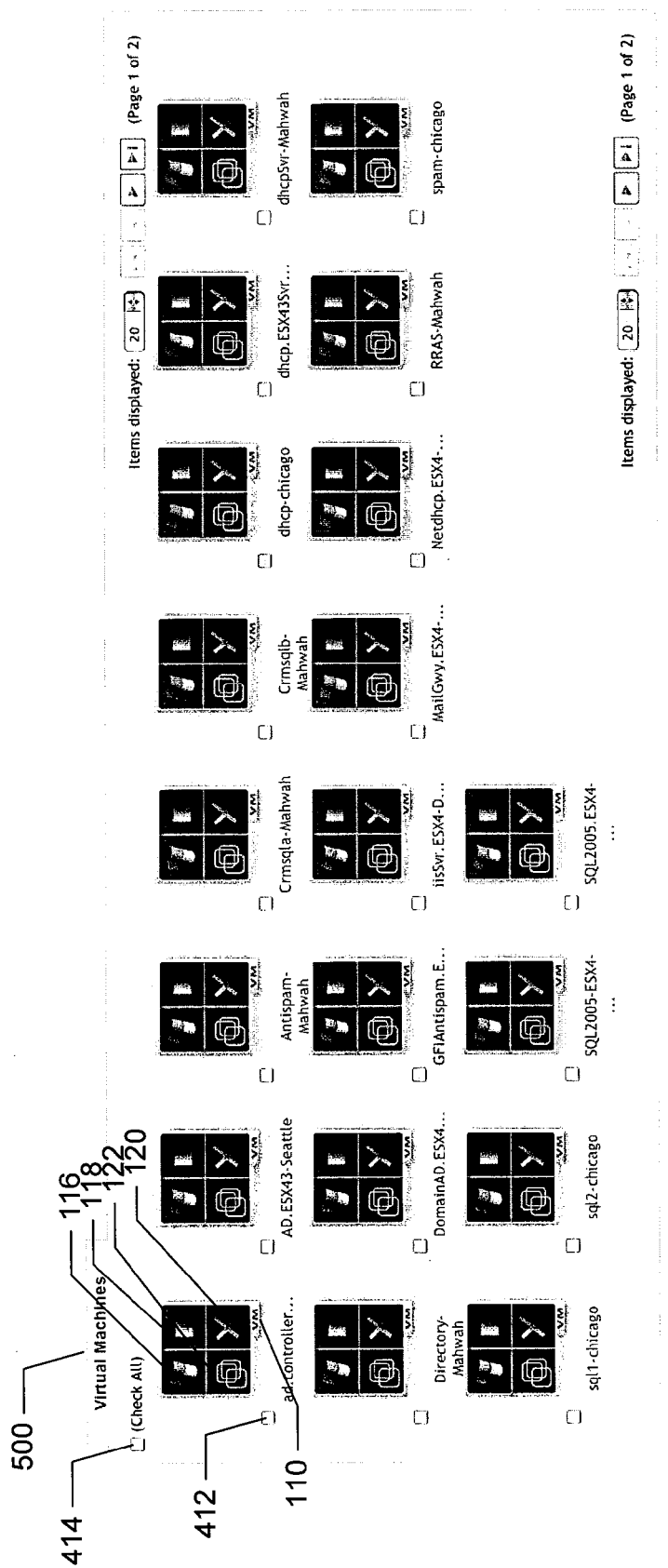
FIG. 5 is an example screenshot showing a plurality of virtual thumbnails representing a plurality of virtual machines.

Separate or combined with determining the number of zones for each virtual thumbnail 110, the variables represented by each zone are preferably determined (block 306). In the example above, the user actions (e.g., drag and drop, list selection, etc.) select both the number of zones and the variable represented by each zone. Alternatively, or in addition, certain zones may be fixed and/or dynamically determined by the system 100. For example, as shown in FIG. 5, the top-left zone 116 may indicate the operating system associated with the corresponding virtual machine 108, the top-right zone 118 may indicate the current run state of the corresponding virtual machine 108, the bottom-right zone 120 may indicate whether the corresponding virtual machine 108 passed one or more policy tests, and the bottom-left zone 122 may indicate the container type of the corresponding virtual machine 108.

Once the system 100 determines the number of zones for each virtual thumbnail 110 (block 304) and the variable to represent in each zone (block 306), the system 100 determines the current state of each of those variables (block 308). For example, the system 100 may need to determine the current operating system and run state of each virtual machine 108. Preferably, each of these items (the number of zones, the variable to represent in each zone, and the current state of each of those variables is stored in memory 208 and/or 218.

The end product of the above-described determining steps is a rendering of each of the virtual thumbnails 110 (block 310). For example, if the top-left zone 116 of a virtual thumbnail 110 is to indicate the current operating system associated with a virtual machine 108, and the current operating system for that virtual machine 108 is Microsoft Windows, then the system 100 displays a flying window icon in the top-left zone 116 of that virtual thumbnail 110.

Once the virtual thumbnails 110 are displayed, the system looks for events associated with the virtual thumbnails 110 (block 312). For example, the user 114 may single click, double click, and/or right click a particular zone of a virtual thumbnail 110. Once an event is detected, the process 300 preferably repeats (block 302). For example, the user 114 may progress from a first window of virtual thumbnails 110 representing a plurality of hosts 104 (see FIG. 4) to a second window of virtual thumbnails 110 representing a plurality virtual machines 108 registered with one of those hosts 104 (see FIG. 5) by clicking on the top-left zone 402 of the virtual thumbnail 110 for that host 104, where the top-left zone 402 of that virtual thumbnail 110 represents the number of virtual machines 108 registered and/or running on the associated host 104. Similarly, the user 114 may progress from the second window of virtual thumbnails 110 representing the plurality of virtual machines 108 (see FIG. 5) to a third window of virtual thumbnails 110 representing a plurality of operating system services or daemons running on one of those virtual machines 108 (see FIG. 6) by clicking on the top-left zone 116 of the virtual thumbnail 110 for that virtual machine 108, where the top-left zone 116 of that virtual thumbnail 110 represents the current operating system, for that virtual machine 108.

Figure 6:
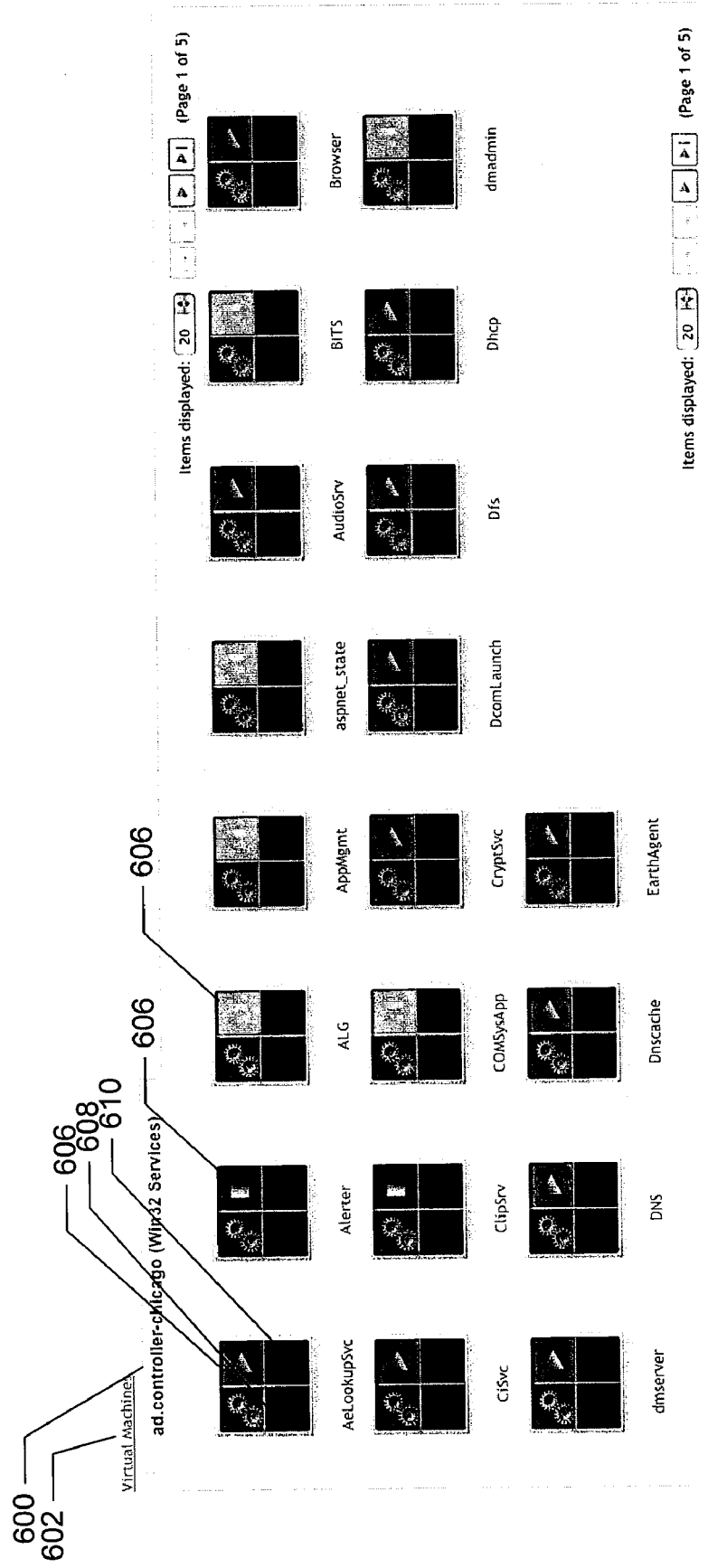
FIG. 6 is an example screenshot showing a plurality of virtual thumbnails representing a plurality of operating system services.

In the example screenshot of FIG. 6, the user 114 may navigate back up a level to the plurality of virtual machines 108 associated with that host 104 by clicking a navigation hyperlink 602. In this example, the top-right zone 606 indicates the current run state of the corresponding operating system service (e.g., a solid block for stopped, two vertical lines for paused, or a right facing triangle for running). The bottom-left zone 608 and the bottom-right zone 610 are unused and may be configured by the system 100 and/or the user 114 (.g., drag and drop).

Figure 7:
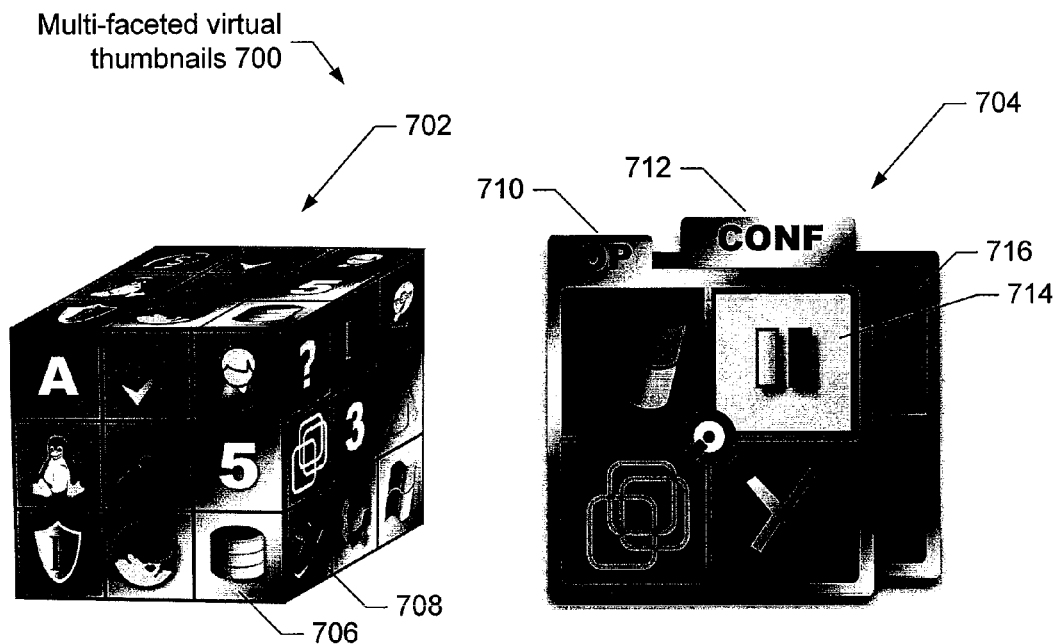
FIG. 7 is an example of two different multi-faceted virtual thumbnails.

Although each of the virtual thumbnails 110 described thus far herein includes a single facet, any suitable number of facets may be used. Examples of multi-faceted thumbnails 700 are illustrated in FIG. 7. More specifically, a cube-shaped thumbnail 702 and a tabbed thumbnail 704 are shown. The example cube-shaped thumbnail 702 includes three facets (or optionally six facets), and the example tabbed thumbnail 704 includes two facets (of course any suitable number of tabs may be included). Each multi-faceted thumbnail 700 preferably includes primary zones 706 and secondary zones 708. Preferably, primary zones 706 are rendered in the plane of the display 112 and substantially the entire zone is visible. In contrast, secondary zones 708 may be out of the plane of the display 112 and/or partially obscured.

Figure 8:
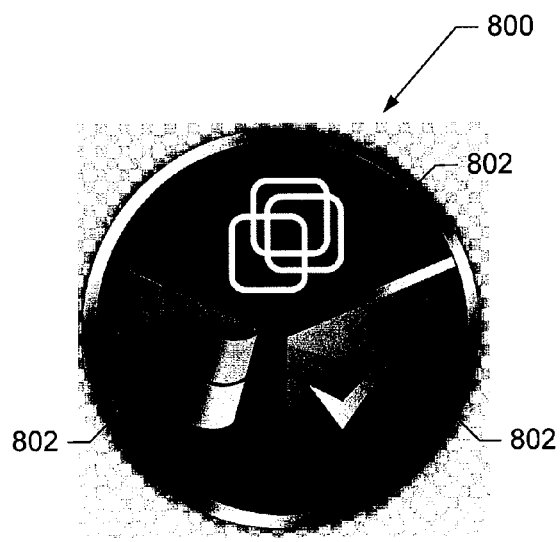
FIG. 8 is an example of a circular virtual thumbnail.

In addition to square and cube shapes, any suitable shape may be used for a virtual thumbnail. For example, a circular or spherical shaped virtual thumbnail may be used. An example of a circular virtual thumbnail 800 is illustrated in FIG. 8. In this example, the circular virtual thumbnail 800 includes three pie-shaped zones 802. Any number of zones and any shape of zones may be used. For example, a virtual thumbnail 110 may have five different irregularly shaped zones.

Returning to FIG. 7, when a user 114 clicks on a primary zone 706, an action associated with that zone may be taken by one of the computing devices 102, 104, 124. For example, when the user clicks a zone indicative of the run-state associated with a virtual machine 108, the run-sate of that virtual machine 108 may be changed (e.g., from paused to started).

In some embodiments, when a user 114 clicks on a secondary zone 708, an action associated with that zone may also be taken by one of the computing devices 102, 104, 124. In other embodiments, when a user 114 clicks on a secondary zone 708, an animation changes the multi-faceted thumbnail 700 into a position where the selected secondary zone 708 becomes a primary zone 706. For example, when a user 114 selects a secondary zone 708 on the cube-shaped thumbnail 702, the cube-shaped thumbnail 702 may rotate from a position where the selected secondary zone 708 is on a side of the cube-shaped thumbnail 702 (i.e., out of the plane of the display 112) to a position where the selected secondary zone 708 is on the face of the cube-shaped thumbnail 702 (i.e., in the plane of the display 112). Similarly, when a user 114 selects a secondary zone 708 on the tabbed thumbnail 704, the tabbed thumbnail 704 may shuffle from a position where the selected secondary zone 708 is behind the primary zone 706 (i.e., obscured) to a position where the selected secondary zone 708 is in front of the former primary zone 706 (i.e., not obscured).

In addition, a multi-faceted thumbnail 700 may include a facet handle 710. Preferably, when the user 114 selects the facet handle 710 (e.g., clicks on the facet handle 710 with a mouse cursor), an animation changes the multi-faceted thumbnail 700 into a position where the secondary facet associated with the selected facet handle 710 becomes a primary facet.

Figure 9:
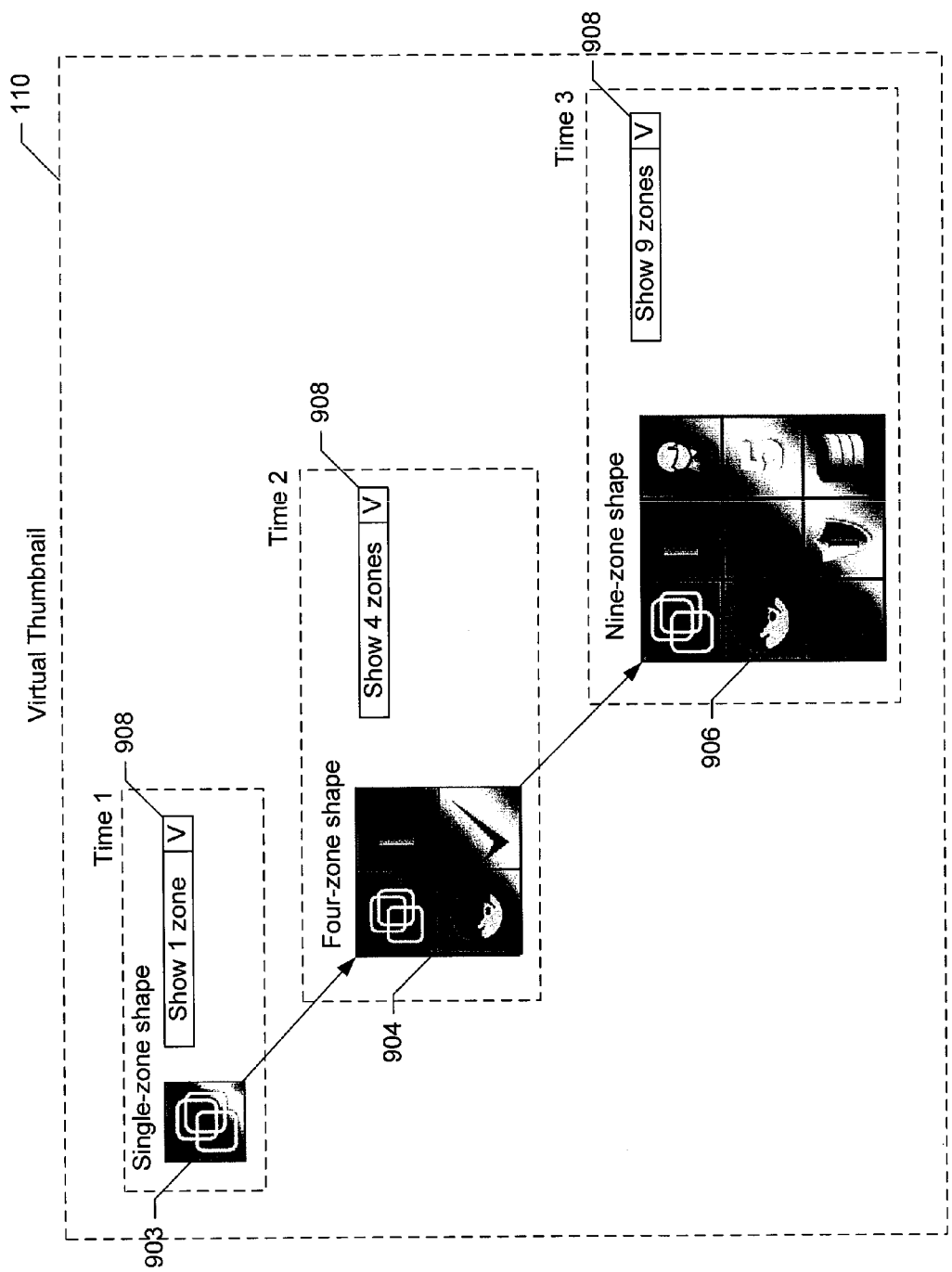
FIG. 9 is a sequence of block diagrams showing an expansion of a virtual thumbnail from a single-zone shape to a four-zone shape and then to a nine-zone shape.

The size and corresponding number of zones for each virtual thumbnail may change dynamically to show more or fewer variables. A sequence of block diagrams showing an expansion of a virtual thumbnail 110 from a single-zone shape 902 to a four-zone shape 904 and then to a nine-zone shape 906 is illustrated in FIG. 9. The user 114 may choose to change the size and/or number of zones for a virtual thumbnail 110 using any suitable method. For example, the user 114 may select the number of zones to be displayed from a drop down menu 908. In such an instance, all of the virtual thumbnails 110 in an associated window are preferably changed to the selected size.

Figure 10:
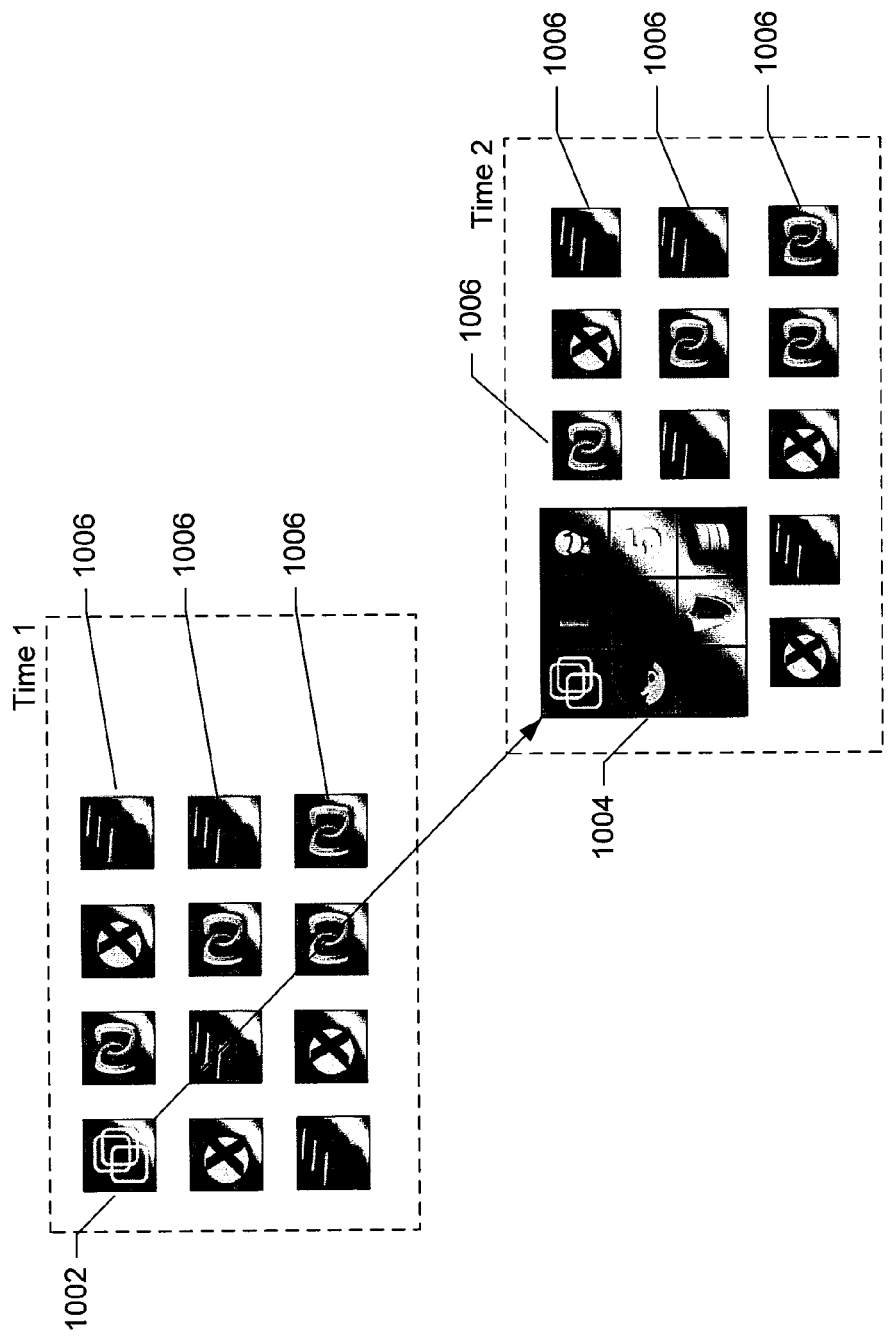
FIG. 10 is a sequence of block diagrams showing an expansion of a virtual thumbnail from a single-zone shape to a nine-zone shape and the resulting movement of the surrounding virtual thumbnails.

Alternatively, the user 114 may expand or contract a virtual thumbnail 110 by dragging a corner and/or other border portion of the virtual thumbnail 110 (as indicated by the arrows in FIG. 9). When a virtual thumbnail 110 is expanded, surrounding virtual thumbnails 110 may be automatically moved to accommodate the expanding virtual thumbnail 110. A sequence of block diagrams showing an expansion of a virtual thumbnail 110 from a single-zone shape 1002 to a nine-zone shape 1004 and the resulting movement of the surrounding virtual thumbnails 1006 is illustrated in FIG. 10.

In summary, persons of ordinary skill in the art will readily appreciate that methods and apparatus of interfacing a user with a computer have been provided. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention claimed is:

1. A method of interfacing with a computer user to display computer systems management information, the method comprising:
   determining a first association between a first systems management variable and a first zone of a first multi-zone shape;
   determining a second association between a second systems management variable and a second zone of the first multi-zone shape;
   determining a first state associated with the first systems management variable;
   determining a second state associated with the second systems management variable;
   rendering the first multi-zone shape to be indicative of (i) the first state of the first systems management variable in the first zone of the first multi-zone shape and (ii) the second state of the second systems management variable in the second zone of the first multi-zone shape;
   rendering a plurality of additional multi-zone shapes such that the first multi-zone shape is displayed at the same time as the plurality of additional multi-zone shapes;
   generating a first software event in response to receiving a first user action associated with the first zone of the first multi-zone shape; and
   generating a second software event in response to receiving a second user action associated with the second zone of the first multi-zone shape, the second software event being different than the first software event.

2. The method of claim 1, wherein the first association between the first variable and the first zone is a user definable association.

3. The method of claim 1, including sorting a plurality of multi-zone shapes based on a value associated with one of multiple zones contained within the plurality of multi-zone shapes.

4. The method of claim 1, wherein rendering the first multi-zone shape includes rendering a multi-faceted multi-zone shape.

5. The method of claim 1, wherein the multi-faceted multi-zone shape includes a cube.

6. The method of claim 1, wherein the multi-faceted multi-zone shape includes a tabbed layers.

7. The method of claim 1, wherein the first software event causes a computer to display a plurality of multi-zone shapes indicative of a plurality of virtual machines.

8. The method of claim 1, wherein the first multi-zone shape represents a virtual machine.

9. The method of claim 8, wherein the first variable is indicative of an operating system associated with the virtual machine.

10. The method of claim 8, wherein the first variable is indicative of a run state associated with the virtual machine.

11. The method of claim 10, wherein the second variable is indicative of an operating system associated with the virtual machine.

12. The method of claim 1, including determining a first number of zones for the first multi-zone shape.

13. The method of claim 12, wherein the first number of zones is a constant number of zones.

14. The method of claim 12, wherein the first number of zones is a variable number of zones.

15. The method of claim 12, wherein the first number of zones is a user definable number of zones.

16. The method of claim 12, including: determining a second number of zones for a second multi-zone shape, the second number of zones being different than the first number of zones; and displaying the second multi-zone shape.

17. The method of claim 16, wherein displaying the second multi-zone shape includes displaying the second multi-zone shape contemporaneously with the first multi-zone shape.

18. The method of claim 1, wherein the first user action includes at least one of a single mouse click, a double mouse click, and a right mouse click.

19. The method of claim 1, wherein the first software event causes execution of a first user defined software routine, and the second software event causes execution of a second user defined software routine, the first user defined software routine being different then the second user defined software routine.

20. A method of displaying a virtual thumbnail, the method comprising:
   determining a first plurality of associations between a first plurality of variables and a first plurality of zones for a first size of the virtual thumbnail;
   determining a first plurality of states associated with the first plurality of variables;
   rendering the virtual thumbnail in the first size to be indicative of the first plurality of states associated with the first plurality of variables;
   receiving an instruction to change the virtual thumbnail from the first size to a second different size;
   determining a second plurality of associations between a second plurality of variables and a second plurality of zones for the second size of the virtual thumbnail, the second plurality of zones having a different number of zones than the first plurality of zones;
   determining a second plurality of states associated with the second plurality of variables;
   rendering the virtual thumbnail in the second size to be indicative of the second plurality of states associated with the second plurality of variables;
   rendering a plurality of additional multi-zone shapes such that the first multi-zone shape is displayed at the same time as the plurality of additional multi-zone shapes;

generating a first software event in response to receiving a first user action associated with a first zone in the first plurality of zones; and generating a second software event in response to receiving a second user action associated with a second zone in the first plurality of zones, the second software event being different than the first software event.

21. The method of claim 20, including moving a plurality of adjacent virtual thumbnails in response to rendering the virtual thumbnail in the second size.

22. The method of claim 20, including:

generating a third software event in response to receiving a third user action associated with a third zone in the second plurality of zones; and generating a fourth software event in response to receiving a fourth user action associated with a fourth zone in the second plurality of zones, the fourth software event being different than the third software event.

23. The method of claim 20, wherein first plurality of associations between the first plurality of variables and the first plurality of zones are user definable associations.

24. The method of claim 20, including sorting a plurality of virtual thumbnails based on a value associated with at least one of the first plurality of variables.

25. The method of claim 20, wherein rendering the virtual thumbnail in the first size includes rendering a first multi-faceted multi-zone shape.

26. The method of claim 25, wherein rendering the virtual thumbnail in the second size includes rendering a second multi-faceted multi-zone shape, the second multi-faceted multi-zone shape being different than the first multi-faceted multi-zone shape.

27. The method of claim 20, wherein the first plurality of variables and the second plurality of variables are systems management variables.

28. The method of claim 20, wherein the virtual thumbnail represents a virtual machine.

29. The method of claim 28, wherein the first variable is indicative of an operating system associated with the virtual machine.

30. The method of claim 28, wherein the first variable is indicative of a run state associated with the virtual machine.

31. An apparatus for interfacing with a computer user, the apparatus comprising:

a controller;

a display device operatively coupled to the controller; and a memory device operatively coupled to the controller, the memory device storing a software program to cause the controller to:

determine a first plurality of associations between a first plurality of variables and a first plurality of zones for a first size of the virtual thumbnail;

determine a first plurality of states associated with the first plurality of variables;

render the virtual thumbnail in the first size to be indicative of the first plurality of states associated with the first plurality of variables;

receive an instruction to change the virtual thumbnail from the first size to a second different size;

determine a second plurality of associations between a second plurality of variables and a second plurality of zones for the second size of the virtual thumbnail, the second plurality of zones having a different number of zones than the first plurality of zones;

determine a second plurality of states associated with the second plurality of variables;

render the virtual thumbnail in the second size to be indicative of the second plurality of states associated with the second plurality of variables;

rendering a plurality of additional multi-zone shapes such that the first multi-zone shape is displayed at the same time as the plurality of additional multi-zone shapes;

generating a first software event in response to receiving a first user action associated with a first zone in the first plurality of zones; and generating a second software event in response to receiving a second user action associated with a second zone in the first plurality of zones, the second software event being different than the first software event.

32. A non-transitory computer readable memory storing software instructions to cause a computing device to:

determine a first plurality of associations between a first plurality of variables and a first plurality of zones for a first size of the virtual thumbnail;

determine a first plurality of states associated with the first plurality of variables;

render the virtual thumbnail in the first size to be indicative of the first plurality of states associated with the first plurality of variables;

receive an instruction to change the virtual thumbnail from the first size to a second different size;

determine a second plurality of associations between a second plurality of variables and a second plurality of zones for the second size of the virtual thumbnail, the second plurality of zones having a different number of zones than the first plurality of zones;

determine a second plurality of states associated with the second plurality of variables;

render the virtual thumbnail in the second size to be indicative of the second plurality of states associated with the second plurality of variables;

rendering a plurality of additional multi-zone shapes such that the first multi-zone shape is displayed at the same time as the plurality of additional multi-zone shapes;

generating a first software event in response to receiving a first user action associated with a first zone in the first plurality of zones; and generating a second software event in response to receiving a second user action associated with a second zone in the first plurality of zones, the second software event being different than the first software event.

* * * * *